United States Patent [19]
Mintgen

[11] Patent Number: 5,398,786
[45] Date of Patent: Mar. 21, 1995

[54] FLUID OPERATED DAMPER UNIT

[75] Inventor: Rolf Mintgen, Thür, Germany

[73] Assignee: Stabilus GmbH, Koblenz-Neuendorf, Germany

[21] Appl. No.: 43,352

[22] Filed: Apr. 6, 1993

[30] Foreign Application Priority Data

Apr. 10, 1992 [DE] Germany .................. 42 12 078.0

[51] Int. Cl.$^6$ ............................................. F16F 9/48
[52] U.S. Cl. .................. 188/284; 188/282; 188/283
[58] Field of Search .............. 188/322.11, 322.14, 188/282–286, 313–316, 318, 322.15, 322.19, 322.22, 269; 251/324, 325; 417/595, 552; 91/422; 92/85 R, 85 B; 280/708

[56] References Cited

U.S. PATENT DOCUMENTS

| 4,768,629 | 9/1988 | Wossner | 188/284 |
| 5,095,581 | 3/1992 | Sarto | 188/284 |

FOREIGN PATENT DOCUMENTS

| 1251165 | 9/1967 | Germany . |
| 2221945 | 11/1972 | Germany . |
| 2218475 | 10/1973 | Germany . |
| 2245258 | 3/1974 | Germany . |

OTHER PUBLICATIONS

*Bestimmung der Explosionsgrenzen von Gasen und Gasgemischen in Luft*, DIN 51 649, Dec. 1986, pp. 1–6.

Primary Examiner—Robert J. Oberleitner
Assistant Examiner—Clifford T. Bartz
Attorney, Agent, or Firm—Brumbaugh, Graves, Donohue & Raymond

[57] ABSTRACT

According to an illustrative example of the invention a fluid damper comprises a cylinder and a piston rod axially movable through one axial end of the cylinder. The piston rod is provided with two damping pistons within a cavity inside the cylinder. The two pistons are axially spaced and in sealing engagement with an internal circumferential face of the cylinder. In a middle section of the cylinder there is provided a by-pass by an axial groove in the inner circumferential wall of the cylinder. In each axial position of the piston rod at least one piston is within the axial extent of the by-pass. When one of the pistons moves beyond the axial extent of the by-pass toward an axial cylinder end nearer to this piston, a throttled channel through this piston allows restricted fluid flow through the piston. When this piston moves in the other direction away from the nearer end of the cylinder, liquid can flow through this piston without substantial flow resistance.

26 Claims, 1 Drawing Sheet

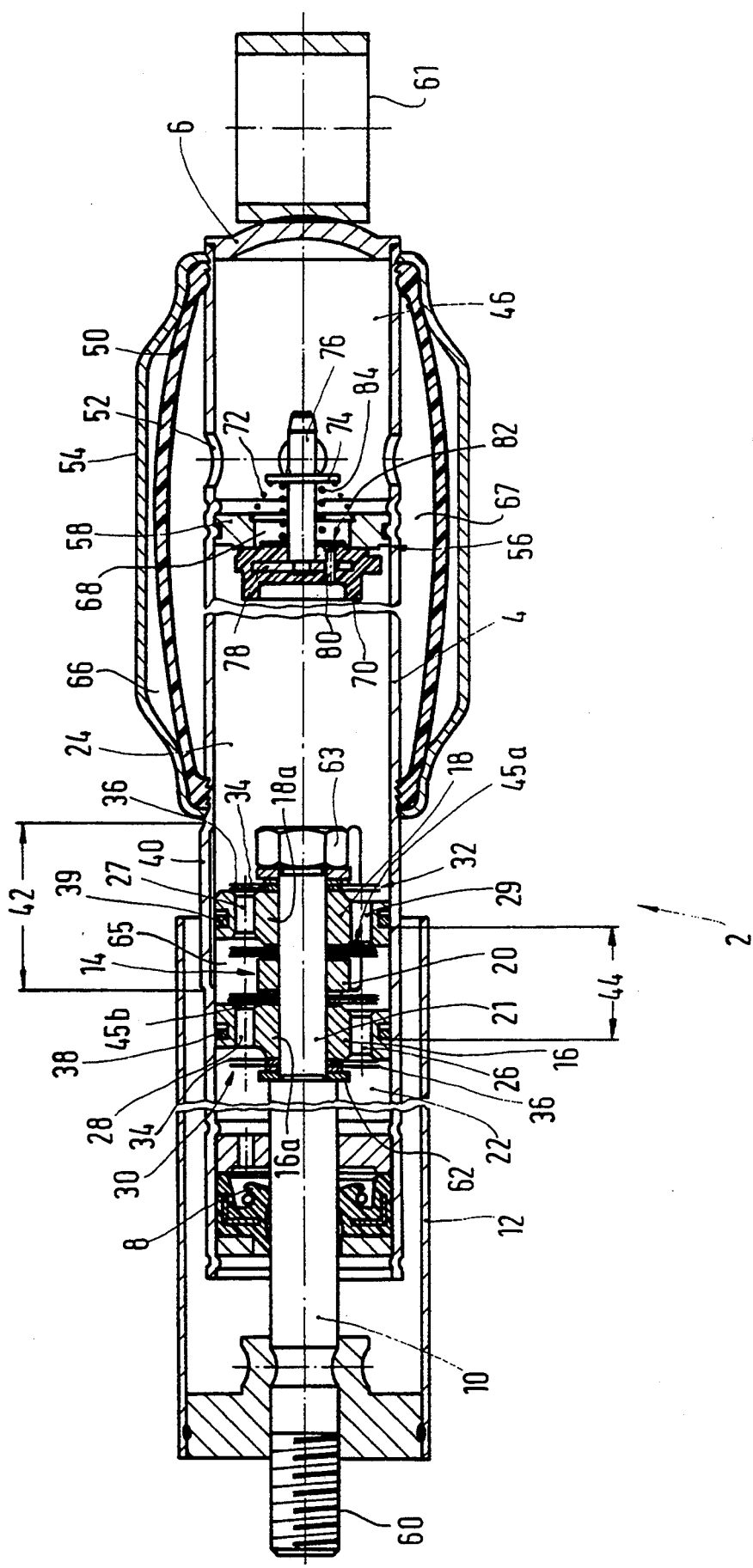

FLUID OPERATED DAMPER UNIT

BACKGROUND OF THE INVENTION

This invention relates to a fluid operated damper unit. Fluid operated damper units as considered by the present invention may be used for damping relative movement of two constructional parts in a mechanical construction; more particularly, such a fluid operated damper unit may be used in combination with a linear driving unit which is used for performing relative movement of said constructional parts. In such a combination, it is sometimes desirable that the relative movement of the constructional parts is damped when approaching both ends of a respective path of relative movement, whereas in a respectively preceding section of said path of movement, the damping effect is reduced or zero, this behaviour being true for both directions of relative movement. An example for such a situation are gear boxes of modern vehicles and more particularly, trucks. In such gear boxes, a pneumatic or hydraulic positioning device of the cylinder piston type is used for providing a desired gear ratio by movement of a gear wheel. The positioning device is movable in opposite directions. After a first phase of movement of the positioning device, a synchronization is obtained. After the synchronization has been obtained, the positioning device continues its movement in the same direction until the desired transmission ratio has been finally reached. This is true for both directions of movement.

In such an application it is desirable that for both directions of movement the positioning device moves during the first phase, i.e. from a respective terminal position, as quickly as possible and at minimum energy consumption, until the synchronization is initiated. Hereupon, a damped further movement of the positioning device is desired.

STATEMENT OF THE PRIOR ART

From German Patent 12 51 165 a damper unit, namely a shock absorber for a motor vehicle suspension, is known. In this known damper unit, an outer cylinder is slidably movable on an inner cylinder. The outer cylinder is closed at one end thereof. The inner cylinder is provided with two partitions adjacent its end nearer to the closed end of the outer cylinder. A control rod is provided at the closed end of the outer cylinder. This control rod extends through respective bores of the partitions. The cross-sectional area of the control rod is variable along the length of the control rod. The partitions are provided with check valves. The behaviour of this hydraulic shock absorber is such that in both directions of movement a maximum damping effect is obtained when approaching the respective end position of the respective movement. The known device has, however, disadvantages. A principal disadvantage is that the construction is complicated, particularly with respect to the use of the control rod. It is very difficult to manufacture and insert the control rod in such a way that a desired damping behaviour is obtained. Even small deviation from a predetermined profile of the control rod and even small deviation of the correct position of the control rod result in deviations of the damping behaviour from a desired damping behaviour. Moreover, the manufacturing of the control rod is most difficult in mass production. The profile of the control rod is not allowed to have any fins or burs which enter into the valves during operation. Moreover, it is difficult to modify the damping behaviour. This can only be done by providing control rods of different profiles. This is particularly true, if one wants different damping behaviour in dependence of the direction of movement.

Moreover, the known construction does not show provisions for allowing the use thereof in a horizontal position.

OBJECT OF THE INVENTION

It is an object of the present invention to have an oscillation damper which provides for both directions of movement an increased damping effect when approaching the terminal position of movement in the respective direction, this oscillation damper being reliable in operation, uncomplicated in design and easy to be manufactured. A further object is to have an oscillation damper, the damping behaviour of which can easily be adapted to the respective operational requirements.

SUMMARY OF THE INVENTION

A fluid operated damper unit comprises a cylinder member having an axis, two cylinder ends and a cavity within the cylinder member. A piston rod unit is axially movable with respect to the cylinder member and sealingly extends through at least one of the two cylinder ends. Damping means are provided on the piston rod unit. A damping fluid is contained within the cavity. The piston rod unit is movable along a predetermined path along the axis. Movement of the piston rod unit with respect to the cylinder member is subject to variable damping resistance in response to the location of the piston rod unit along its path of movement.

The piston rod unit is provided with two axially spaced piston units within the cavity. The piston units have respective annular sealing engagement zones co-operating with an internal cylindrical face of the cylinder member. The annular sealing engagement zones have a maximum axial distance. By-pass passage means are provided along a part of the axial length of the cylinder member. These by-pass passage means have an axial extent at least equal to the maximum distance of the sealing engagement zones. The by-pass passage means provide a fluid connection between fluid spaces on both sides of a respective piston unit, when the sealing engagement zone of the respective piston unit is located within the axial extent of the by-pass passage means. Each of the piston units is movable beyond the by-pass passage means toward a respective cylinder end nearer to the respective piston unit. Throttled flow passage means are provided across each of the piston units. These throttled flow passage means of a respective piston unit provide a damping resistance for the piston rod unit in response to axial movement thereof, when the respective piston unit moves beyond the axial extent of the by-pass passage means toward the respective axial cylinder end nearer to the respective piston unit.

The fluid operated damper unit as defined above has the advantage over the prior art device of German patent 12 51 165 that a considerable reduction of mass is obtained because the necessity of two cylinders is avoided. Moreover, the damping behavior is not further dependent of the profile of a control unit. The damping behavior can rather be adjusted to a desired damping behavior by selection and/or adjustment of the throttled flow passage means of the piston units. Easily available components can be used for assembling the damper unit. The damper unit as a whole is of compact design.

The throttled flow passage means are preferably selected such as to provide a larger fluid flow resistance when a respective piston unit moves beyond the axial extent of the by-pass passage means toward the respective axial cylinder end nearer to the respective piston unit and a smaller fluid flow resistance when the respective piston unit moves from the respective nearer cylinder end toward the by-pass passage means. Thus, one obtains a damper unit in which the damping resistance is small or practically zero for each direction of movement during a first section of the path of movement adjacent a first terminal relative position and is increased during a second section of the path of relative movement adjacent a second terminal relative position.

The axial extent of the by-pass passage means is preferably larger than the maximum axial distance of the annular sealing engagement zones. Thus, the first section of the relative path of movement, in which only a low damping resistance or no damping resistance occurs, can be prolongated.

The by-pass passage means are preferably located within the predetermined path of relative movement such that in a terminal position of at least one of the piston units adjacent a respective cylinder end nearer to the piston unit the other piston is located with its respective sealing engagement zone within the axial extent of the by-pass passage means. By such a construction one can again make sure that—for both directions of movement—in a first section of the path of movement adjacent a first terminal relative position only a low or no damping resistance occurs and in a second section of the path of relative movement a desired damping resistance damps the relative movement. The length of the section of relative movement, in which a damping resistance occurs, can be selected by the distance between the position of a respective piston unit in the second terminal relative position and the end of the by-pass passage means which is nearer to the piston unit in the second terminal position of the relative movement. It is easily understandable that one has to increase the distance of the two piston units if one wants to increase the second section of the path of relative movement in which a damping resistance occurs.

Preferably the by-pass passage means are located within the predetermined path of relative movement such that in the terminal positions of both piston units adjacent respective cylinder ends nearer to the respective piston unit the respective other piston unit is located with its respective sealing engagement zone within the axial extent of the by-pass passage means.

The by-pass passage means may be obtained in providing at least one substantially axially extending groove in an internal cylindrical face of the cylinder member. This axially extending groove may be obtained by radially outward directed coining or pressing operation such that the cylinder may be provided on its external cylindrical face with a radially outward projection corresponding in shape substantially to the axially extending groove.

The throttled flow passage means across the respective piston unit may comprise first branch passage means with throttling means allocated thereto, these throttling means being biased toward a position of reduced cross-sectional area and providing in cooperation with the first branch passage means the above mentioned larger flow resistance. On the other hand, the throttled flow passage means may further comprise second branch passage means and one-way valve means allocated thereto, these one-way valve means providing in cooperation with the second branch passage means the above mentioned smaller or zero fluid flow resistance.

It is a further advantage of the damper unit of the present invention above the device of German patent 12 51 165 that one can easily obtain a decreasing flow resistance characteristic on movement of the respective piston unit to the respective nearer cylinder end in response to increasing velocity of movement of the piston rod unit such that the increase of flow resistance becomes smaller with increasing velocity. For obtaining this effect it is only necessary to correspondingly select the biasing means biasing the above mentioned throttling means toward the position of reduced cross-sectional area.

The throttled flow passage means may further comprise continuously open primary passage means with a constant throttling cross-sectional area. In using such continuously open primary passage means one can obtain a damping resistance characteristic in dependence of a velocity as follows: At a low velocity of relative movement of the piston rod unit and the cylinder member the increase of damping resistance becomes larger with increasing velocity until the throttle means are lifted from the first branch passage means. After such lifting the increase of damping resistance becomes smaller with increasing velocity of relative movement of the piston rod unit and the cylinder member.

The damping behavior of the damper unit may be asymmetric. This can be obtained in that the throttled flow passage means of two piston units are different from each other. More particularly, the throttle means may be differently biased in the two piston units.

The piston units may be assembled with the piston rod units with a spacer sleeve therebetween. Thus, the assembling of the piston rod unit is considerably facilitated. It is only necessary to provide one abutment for one of the piston units on the piston rod unit and to provide a nut member or the like acting onto the other piston unit with the sleeve member located between the two piston units.

If the damping fluid is a liquid and not a gas and the piston rod unit extends only through one of the cylinder ends, it is desirable that one of the piston units, which is nearer to the one cylinder end through which the piston rod unit extends, has a slightly smaller diameter than the other of the piston units which is more remote from the one cylinder end. In this case, one obtains a large guiding length of the damper unit, i.e. a large distance between the guiding location at the one cylinder end on the one hand, and the piston unit of larger diameter on the other hand, and can, moreover, avoid a multiple centering of the piston rod unit within the cylinder member. The sealing engagement between the piston units and the internal cylindrical face of the cylinder member is not prevented because this sealing engagement is preferably obtained by elastic sealing rings which define the above discussed sealing engagement zones.

The damping fluid is preferably a damping liquid. A damping liquid volume compensating means may be provided to compensate for volume variation of the piston rod unit within the cavity in response to axial movement of the piston rod unit. One possibility of providing such volume compensating means is to provide the piston rod unit with a prolongation which has the same diameter as the piston rod member extending through one end of the cylinder member and to sealingly guide this prolongation through an opening in the second cylinder end. Thus, the volume within the cavity is substantially not changed when the cylinder rod unit moves with respect to the cylinder member in the axial direction thereof.

If one wants to avoid such a prolongation of the piston rod unit, one can provide a gas volume adjacent the liquid. This gas volume is preferably a gas volume under pressure, so that the gas volume provides a support for the liquid on relative movements of the piston rod unit and the cylinder member which cause a compression of the gas volume.

Preferably the gas volume is separated from the liquid by movable separating means. This is a feature of utmost importance because it allows horizontal orientation of the damper unit in operation. In case of using such movable separating means the gas volume can also be replaced by mechanical spring means acting onto the separating means, particularly in case of using a rigid floatable partition as separating means.

The movable separating means may also be provided by a flexible membrane. This flexible membrane may be supportable by a support surface.

The gas volume may be provided, for example, within an annular space surrounding the cylinder member. Such an arrangement allows to have a relatively short cylinder member.

For making sure that in a phase of operation in which the volume of gas is increasingly compressed by the movement of the piston rod unit with respect to the cylinder member, a complete liquid filling is maintained between the two piston units and on the side of the piston units, remote from the gas volume, one may provide liquid support means between a first portion of the liquid adjacent the gas volume and a second portion of the liquid. These liquid support means comprise support valve means adapted for liquid flow therethrough in opposite flow directions. These support valve means preferably provide increased flow resistance for the liquid in a direction of flow corresponding to compression of the gas volume and a reduced flow resistance for the liquid in a direction of flow corresponding to expansion of the gas volume. This assures that in each operational phase the liquid spaces between and adjacent the two piston units are always completely filled with liquid. The support valve means may contribute to the damping resistance such that the damping force for at least one direction of relative movement is dependent on both the flow resistance across the respective piston unit and the flow resistance of liquid flow through the support valve means.

Preferably the damping liquid is always under super atmospheric pressure even when the piston rod and the cylinder member are not loaded by external axial forces.

With the fluid operated damping unit of this invention it is easily possible to make the damping resistance against relative movement of the piston rod unit and the cylinder member different in dependence of the direction of movement.

It has been mentioned above that the by-pass passage means may be provided by at least one groove. One can provide, for example, one single groove which extends over the complete extent of the by-pass passage means. It is possible, however, to provide a plurality of grooves which are distributed around the circumference of the cylinder member. It is also possible to provide a plurality of circumferentially spaced and axially overlapping grooves which define in combination the axial extent of the by-pass passage means.

The piston units may be manufactured from standard piston members which are combined with a plurality of throttle means and one-way valve means, to be selected in accordance with the desired damping behavior. It is also possible to provide passage bores through the piston members of selected diameter.

From the above discussion one can easily understand that the damping behavior of the damper unit along the relative path of movement is dependent on the distance between the piston units. This distance can be easily varied by using spacer sleeves of different lengths. The assembling of the piston unit with the aid of the spacer sleeve allows to use a simple form of a piston rod with only one or a small number of abutments and to avoid weakening of the cross-sectional area of the piston rod.

The above mentioned flexible membrane is preferably an elastic membrane made of rubber or rubber-like material. The use of such membranes avoids the necessity of movable sealing means which would be necessary in case of rigid floating partitions.

The damper unit of the present invention is particularly useful for performing a gear change in gear boxes of motor vehicles and especially trucks. The damper unit can be arranged in parallel with a linear driving unit used for moving a gear wheel with the aim of a change of the transmission ratio. The damper unit of the present invention allows a quick movement in a first section of movement without substantial damping and a damped movement in a subsequent section of movement and this may be true for both directions of movement. The transition between the two sections of movement may be coincident with the initiation of a synchronizing operation.

The various features of novelty which characterize the invention are pointed out with particularity in the claims annexed hereto and forming a part of the disclosure. For a better understanding of the invention, its operating advantages and specific objects attained by it's use, reference should be had to the accompanying drawing and descriptive matter in which there is illustrated and described a preferred embodiment of the invention.

BRIEF DESCRIPTION OF THE DRAWING

The invention will be explained in greater detail hereafter with reference to an embodiment shown in the accompanying drawing.

DETAILED DESCRIPTION OF THE PREFERRED EMBODIMENT

The damper is shown in the drawing in a longitudinal section and is as a whole designated by the reference number 2. The damper unit 2 comprises a cylindrical pressure tube 4 which is closed at one of its ends by a bottom 6 and further comprises a sealing and guiding unit 8 adjacent the other cylinder end. A piston rod 10 extends through the guiding and sealing unit 8. This piston rod 10 is axially movable with respect to the pressure tube 4. Connection means 60 and 61 are provided at the lefthand end of the piston rod 10 and the righthand end of the pressure tube 4 respectively. These connecting means are intended for connecting the damper unit to a mechanical construction, for example, a driving unit for a gear change in a gear box of a motor vehicle. A cover tube 12 for protection of the piston rod surrounds the external section of the piston rod 10. A piston assembly 14 is mounted on the piston rod 10 at the inner end thereof within the cavity defined by the pressure tube 4. This piston assembly comprises two piston units 16 and 18. These piston units 16 and 18 are positioned on the piston rod 10 with a predetermined distance by a spacer sleeve 20 between an abutment disk 62 and a nut 63. The piston assembly 14 subdivides the cavity within the pressure tube 4 into two working spaces 22 and 24 which are always filled with a damping liquid. The piston units 16,18 are provided with channels 26,27,28,29 which are adapted to connect the working space 22 and the working space 24. The number and dimension of the channels are variable. The channels 26 and 27 are provided with check valve members 30 and 32. These check valve members are established by axially movable disks 34 which are supported by support disks 36. The check valve members 30 and 32 are arranged such that the check valve member 30 adjacent the working space 22 closes the channel 26 when the piston rod 10 is moved outward and that the check valve member 32 allocated to the channel 27 closes the channel 27 when the piston rod 10 is moved into the pressure tube 4.

The flow resistance through the channels 26 and 27 is small or zero when the check valve members 30 and 32 are lifted at respective axial directions of movement of the piston rod 10. The channels 28 and 29 are closed by respective spring biased throttling disks 45b and 45a which are biased in closing direction. When the piston rod 10 moves out of the pressure tube the spring biased throttling disk 45b is lifted from the respective channel 28 in response to a pressure difference between an increased pressure in the working space 22 and a reduced pressure in the working space 24 and the intermediate space 65. When the piston rod 10 moves inward of the pressure tube 4 the spring biased throttling disk 45a is lifted from the channel 29 in response to an increased pressure within the working space 24 and a reduced pressure within the working space 22 and the intermediate working space 65.

It is recommended to use identic piston members 16a and 18a as basic components for obtaining the piston units 16 and 18. These piston members 16a and 18a are assembled in symmetric arrangement with respect to a plane of symmetry located between the two piston members.

The piston member 16a has a somewhat smaller diameter than the piston member 18a such as to obtain a maximum guide length of the piston rod unit within the pressure tube.

In a longitudinal section of the pressure tube 4 which is designated by 42 there is provided a by-pass groove system 40. This by-pass groove system comprises one or more substantially axially extending grooves. These grooves can be coined or pressed into the internal circumferential surface of the pressure tube 4. When one of the piston units 16 and 18 is positioned within the axial section 42, liquid can flow across the respective piston unit without substantial flow resistance. When both piston units 16 and 18 are positioned within the length of the longitudinal section 42, the liquid can flow across both piston units 16,18 of the piston assembly 14. Then no damping resistance resists to the axial movement of the piston rod 10 with respect to the pressure tube 4. The axial extent of the section 42 is selected such that it is larger than the maximum distance of the piston rings which is indicated at 44. This maximum distance of the piston rings is measured from the lefthand end of the piston ring 38 to the righthand end of the piston ring 39. When the piston assembly 14 with both piston units 16 and 18 is within the axial section 42, no damping force resists to the axial movement of the piston rod 10.

When the piston unit 16 is in its leftward terminal position corresponding to the outermost position of the piston rod 10 the piston unit 18 is still within the axial section 42. When on the other hand the piston unit 18 is in its most rightward position with respect to the pressure tube 4, i.e. when the piston rod 10 is in its innermost position with respect to the pressure tube 4, the piston unit 16 is still within the axial section 42.

The righthand end portion of the pressure tube 4 is surrounded by a flexible elastic membrane 50. This membrane 50 again is surrounded by a casing 54. The space 66 between the membrane 50 and the casing 54 is filled with a pressurized gas. The space 67 between the flexible membrane 50 and the pressure tube 4 is filled with damping liquid and is in connection with a chamber 46 inside the pressure tube 4 through bores 52. The space 46 is also filled with a damping liquid as the working chambers 22, 24 and the intermediate space 65 are.

The working space 24 is separated from the space 46 by a partition 58. This partition 58 is provided with valve means 56. These valve means 56 comprise an opening 68 through the partition 58. The opening 68 is closed by a valve member 70, which is biased in a closing direction by a conical helical compression spring 72. This spring 72 is supported by the partition 58 on the one hand and acts onto a disk 74. This disk 74 is provided on a stem 76. The stem 76 is fastened to the valve member 70 by a core disk 78 provided inside the valve member 70 which valve member may be made of plastics material. Thus, the valve member 70 is urged by the biasing action of the spring 72 toward a closing position. The valve member 70 is provided with an axial bore 80 therethrough. This axial bore 80 is closed by a valve disk 82. This valve disk 82 is biased by a helical compression spring in closing direction with respect to the axial bore 80. The valve disk 82 is liftable from closing position against the action of the helical compression spring 84 which is supported by the disk 74.

The operation of the damper unit so far described is as follows:

It is assumed that the piston rod is in its outermost, i.e. in its most leftward, position with respect to the pressure tube 4. Then a rightward movement of the piston rod begins. At the beginning of this movement the piston unit 16 is leftward of the by-pass section 42 whereas the piston unit 18 is within the by-pass section 42. Liquid can flow from the working space 24 through the by-pass groove 40 to the intermediate space 65 and from the intermediate space 65 through the bore 26 to the working space 22. No substantial flow resistance occurs in the by-pass groove 40 and in the bore 26 because the biasing action acting onto the check valve disk 36 in closing direction is small or zero. No substantial resistance is generated by the piston assembly 14. The entrance of the piston rod 10 into the pressure tube 4 results in a reduction of the volume provided by the working spaces 22 and 24 and the intermediate space 65. Such an increased pressure $P_1$ is generated within these spaces. This increased pressure acts through the bore 80 onto the valve disk 82 and lifts the valve disk 82 with respect to the bore 80, so that liquid can escape through the bore 80 into the space 46. As the space 46 is in communication with the annular space 67 through bores 52 liquid can escape into space 67, such that the flexible membrane 50 is urged radially outward toward the housing 54 with the pressurized gas contained within the annular space 66 being compressed. The cross-sectional area of the bore 80 and the biasing force acting onto the valve disk 82 may be selected such that no substantial throttling effect occurs when liquid is expelled from the working space 24 through the bore 80 to the space 46. So one can say that no substantial damping resistance acts against axial inward movement of the piston rod 10 as long as the piston unit 18 moves within the axial section 42.

When the piston ring 39 moves beyond the righthand end of the axial section 42 the liquid connection provided by the groove 40 becomes ineffective. Therefore, on further movement of the piston rod 10 to the right, the pressure within the working space 24 is considerably increased until the valve disk 45a is lifted from the channel 29. Thus, the liquid can again flow from the working space 24 toward the intermediate space 65 and from the intermediate space 65 to the working space 22. It is to be noted, however, that a considerable flow resistance is obtained by the cooperation of the valve disk 45a with the channel 29. So the rightward movement of the piston rod 10 is damped by a considerable damping resistance. This damping resistance may be increased still by the flow resistance through the bore 80. Even if this bore 80 has a cross-sectional area as large as not to provide an essential flow resistance as long as the piston unit 18 moves within the axial section 42, one has to consider that after the piston unit 18 has moved beyond the rightward end of the by-pass groove 40, the volume reduction per length unit of rightward movement of the piston rod 10 is now defined by the cross-sectional area of the piston unit 18 and not only by the cross-sectional area of the piston rod 10 as it was before, when the piston unit 18 was still moving along the axial section 42. Such large volume of liquid has to be expelled from the working space 24 through the channel 29 on the one hand and the bore 80 on the other hand, because the check valve disk 34 closes the channel 27. So an increased pressure drop occurs across the bore 80. This is highly desirable, because the dependency of the damping force from the gas pressure within the annular chamber 66 is thereby reduced. It can by made sure that the liquid contained within the working space 24 can't simply escape toward the spaces 46 and 67 against the action of pressurized gas acting onto the membrane 50. Thus, the damping resistance acting onto the piston rod 10 can be obtained even at relative low pressure of the gas within the chamber 66. The flow resistance through the bore 80 can be selected such that on rightward movement of the piston rod 10 the working space 22 and the intermediate space 65 remain always fully filled with damping liquid.

Assume now that the piston rod 10 has reached its most rightward position and begins to move leftward again. Now the righthand piston unit 18 is near the righthand end of the pressure tube 4 and rightward of the axial section 42 whereas the piston unit 16 is positioned within the axial section 42. Liquid can flow now from the working space 22 to the intermediate space 65 through the by-pass groove 40 and from the intermediate space 65 through the channel 27 to the working space 24 without substantial flow resistance because the check valve disk 34 is again biased to the closing position only with a small biasing force, if any. So no substantial damping force resists the outward movement of the piston rod 10. The withdrawal of the piston rod 10 from the cavity within the pressure tube 4 results in an increase of the sum of the volumes of the spaces 24,65 and 22. Therefore, liquid can flow from the spaces 67 and 46 toward the working space 24 through the opening 68 because the valve member 78 can be lifted by the pressure of the damping liquid within the space 46 resulting from the pressure of gas within the space 66. As the cross-sectional area of the valve member 70 exposed to the pressure within the space 46 is rather large the valve member 70 can be lifted from the opening 68 even at relatively small pressure within the space 46. Such, the working space 24 can be easily refilled with liquid entering from the space 46 even when the gas pressure within the chamber 66 is relatively small.

On further leftward movement of the piston rod 10 the lefthand piston unit 16 moves beyond the lefthand end of the section 42, so that the by-pass groove 40 becomes ineffective again and liquid can escape from the working space 22 to the intermediate space 65 and further to the working space 24 only through the channel 28 after lifting the throttling disk 45b. The channel 28 and the throttling disk 45b provide a high flow resistance from the working space 22 to the intermediate space 65. Such, the further outward movement of the piston rod 10 is damped.

One can see that in the leftward movement the damping resistance acting onto the piston rod 10 is substantially only dependent on the flow resistance through the channel 28 whereas in the end face of the rightward movement the damping resistance was dependent on both the flow resistance through the channel 29 and the flow resistance through the bore 80.

It is easily understandable that one can select the channels 28,29 and the throttling disks 45b, 45a and the cross-sectional area of the bore 80, the biasing action of the spring 84 and the pressure of the gas within the chamber 66 so that the damping behavior in opposite direction of movement is either similar or different according to the requirements to the damper unit in use.

It is further easily understandable that one can modify without any difficulties the damping behavior in one or both direction by selection of the above enumerated components.

It is repeated: The use of the valve means 56 in connection with the partition 58 makes the damping force on inward movement of the piston rod 10 substantially independent on the gas pressure within the space 66. Moreover, the valve means 56 can be used for modifying the damping behavior on inward movement of the piston rod 10.

The housing 54 protects the flexible membrane against being damaged from outside and against excessive deformation by the liquid pressure in the spaces 46 and 67.

It is to be noted that the partition 58 and the valve means 56 are not absolutely necessary. One can omit the separation between the spaces 24 and 46 if the gas pressure within the space 66 is high enough for providing a sufficient damping force on inward movement of the piston rod.

The membrane 50 makes sure that the working spaces 22,24 and the space 46,67 are always completely filled with damping liquid. This makes it possible to use the damper unit in any required orientation and, more particularly, also in horizontal orientation.

The damping fluid can also be a gas. It is easily understandable that the range of axial movement without damping effect can be increased or shortened by lengthening or shortening the groove 40. When the length of the groove 40 is larger than the distance 44 between the piston rings both piston units 16 and 18 are during an intermediate section of movement in overlapping relationship with the groove 40, so that no damping resistance can act onto the piston rod 10 irrespective of the direction of movement.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What we claim is:

1. A fluid operated damper unit comprising a cylinder member having an axis, two cylinder ends and a cavity within said cylinder member, a piston rod unit being axially movable with respect to said cylinder member and extending sealingly through at least one of said two cylinder ends, damping means being provided on said piston rod unit, a damping fluid being contained within said cavity, said piston rod unit being movable along a predetermined path along said axis, movement of said piston rod unit being subject to variable damping resistance in response to the location of said piston rod unit along said path of movement, said piston rod unit being provided with two axially spaced piston units within said cavity, both of said piston units having respective annular sealing engagement members mounted thereon for substantially common axial movement with the respective piston units along the total length of said predetermined path and cooperating with an internal cylindrical face of said cylinder member, said annular sealing engagement members having a substantially constant axial distance between them, at least one by-pass passage means being provided along an intermediate part of the axial length of said cylinder member, said bypass passage means having respective axial ends spaced apart axially from the cylinder ends, said by-pass passage means having an axial extent at least substantially equal to said axial distance, said by-pass passage means providing a fluid connection between fluid spaces on both sides of a respective piston unit, when the sealing engagement member of the respective piston unit is positioned within the axial extent of said by-pass passage means, each of said piston units being movable beyond said by-pass passage means toward a respective cylinder end nearer to the respective piston unit, throttled flow path passage means being provided across each of said piston units, said throttled flow path passage means of each respective piston unit providing a damping resistance for said piston rod unit in response to axial movement thereof, when the respective piston unit moves beyond the respective axial end of said by-pass passage means toward the respective axial cylinder end nearer to the respective piston unit, said throttled flow passage means being such as to provide a larger fluid flow resistance when a respective piston unit moves beyond said axial extent of said by-pass passage means toward the respective axial cylinder end nearer to said piston unit and a smaller fluid flow resistance when the respective piston unit moves from the respective nearer cylinder end toward and beyond the beginning of said bypass passage means.

2. A fluid operated damper unit comprising a cylinder member having an axis, two cylinder ends and a cavity within said cylinder member, a piston rod unit being axially movable with respect to said cylinder member and extending sealingly through at least one of said two cylinder ends, damping means being provided on said piston rod unit, a damping fluid being contained within said cavity, said piston rod unit being movable along a predetermined path along said axis, movement of said piston rod unit being subject to variable damping resistance in response to the location of said piston rod unit along said path of movement, said piston rod unit being provided with two axially spaced piston units within said cavity, both of said piston units having respective annular sealing engagement members mounted thereon for substantially common axial movement with the respective piston units along the total length of said predetermined path and cooperating with an internal cylindrical face of said cylinder member, said annular sealing engagement members having a substantially constant axial distance between them, at least one by-pass passage means being provided along an intermediate part of the axial length of said cylinder member, said bypass passage means having respective axial ends spaced apart axially from the cylinder ends, said by-pass passage means having an axial extent at least substantially equal to said axial distance, said by-pass passage means providing a fluid connection between fluid spaces on both sides of a respective piston unit when the sealing engagement zone of the respective piston unit is positioned within the axial extent of said by-pass passage means, each of said piston units being movable beyond said by-pass passage means toward a respective cylinder end nearer to the respective piston unit, throttled flow path passage means being provided across each of said piston units, said throttled flow path passage means of each respective piston unit providing a damping resistance for said piston rod unit in response to axial movement thereof when the respective piston unit moves beyond a respective end of the axial extent of said by-pass passage means toward the respective axial cylinder end nearer to the respective piston unit, said throttled flow passage means of each of said piston units being such as to provide a larger fluid flow resistance when the respective piston unit moves beyond said axial extent of said by-pass passage means toward the respective axial cylinder end nearer to said piston unit and a smaller fluid flow resistance when the respective piston unit moves from the respective nearer cylinder end toward and beyond the beginning of said by-pass passage means, said by-pass passage means having such length and being located within said predetermined path of movement such that in a terminal position of both of said piston units adjacent a respective cylinder end nearer to said respective piston unit the respective other piston unit is located with its respective sealing engagement member within the axial extent of said by-pass passage means.

3. A damper unit as set forth in either claim 1 or claim 2, said axial extent of said by-pass passage means being larger than said axial distance.

4. A damper unit as set forth in claim 1, said by-pass passage means having such length and being located within said predetermined path of movement such that in a terminal position of at least one of said piston units adjacent a respective cylinder end nearer to said respective piston unit the other piston unit is located with its respective sealing engagement member within the axial extent of said by-pass passage means.

5. A damper unit as set forth in claim 4, said by-pass passage means having such length and being located within said predetermined path of movement such that in the terminal positions of both said piston units adjacent respective cylinder ends nearer to the respective piston unit the respective other piston unit is located with its respective sealing engagement zone within the axial extent of said by-pass passage means.

6. A damper unit as set forth in either claim 1 or claim 2, said by-pass passage means comprising at least one substantially axially extending groove in an internal cylindrical face of said cylinder member.

7. A damper unit as set forth in claim 6, said cylinder member being provided on an external cylindrical face thereof with a radially outward directed projection corresponding in shape substantially to said axially extending groove.

8. A damper unit as set forth in either claim 1 or claim 2, said throttled flow passage means comprising first branch passage means with throttling means allocated thereto, said throttling means being biased toward a position of reduced cross-sectional flow area and providing in cooperation with said first branch passage means said larger flow resistance.

9. A damper unit as set forth in any one of claims 1, and 2, said throttled flow passage means comprising second branch passage means and one-way valve means providing in cooperation with said second branch passage means said smaller fluid flow resistance or zero fluid flow resistance.

10. A damper unit as set forth in any one of claims 1, and 2, said throttled flow passage means having a decreasing damping resistance characteristic on movement of the respective piston unit toward the respective nearer cylinder end in response to increasing velocity of movement of said piston rod unit such that the increase of damping resistance becomes smaller with increasing velocity.

11. A damper unit as set forth in either claim 1 or claim 2, said throttled flow passage means comprising continuously open primary passage means with a substantially constant throttling cross-sectional area.

12. A damper unit as set forth in either claim 1 or claim 2, said throttled flow passage means of said two piston units being different from each other.

13. A damper unit as set forth in claim 8, said throttling means being differently biased in said two piston units.

14. A damper unit as set forth in either claim 1 or claim 2, said piston units being assembled with said piston rod unit with a spacer sleeve therebetween.

15. A damper unit as set forth in either claim 1 or claim 2, said piston rod unit extending only through one of said cylinder ends, one of said piston units which is nearer to said one cylinder end having a slightly smaller diameter than the other of said piston units which is more remote from said one cylinder end.

16. A damper unit as set forth in either claim 1 or claim 2, said fluid being a liquid, volume compensating means being provided to compensate for volume variation of said piston rod unit within said cavity in response to axial movement of said piston rod unit.

17. A damper unit as set forth in claim 16, said volume compensating means comprising a gas volume adjacent said liquid.

18. A damper unit as set forth in claim 17, said gas volume being separated from said liquid by movable separating means.

19. A damper unit as set forth in claim 18, said movable separating means comprising a flexible membrane.

20. A damper unit as set forth in claim 19, said flexible membrane being supportable by a support surface.

21. A damper unit as set forth in claim 17, said gas volume being provided within an annular space surrounding said cylinder member.

22. A damper unit as set forth in claim 17, liquid support means being provided between a first portion of said liquid adjacent said gas volume and a second portion of said liquid, said liquid support means comprising support valve means adapted for liquid flow therethrough in opposite flow directions.

23. A damper unit as set forth in claim 22, said support valve means providing increased flow resistance for said liquid in a direction of flow corresponding to compression of said gas volume and a reduced flow resistance for said liquid in a direction of flow corresponding to expansion of said gas volume.

24. A damper unit as set forth in either claim 1 or claim 2, said fluid being under a pressure higher than atmospheric pressure even when said piston rod unit and said cylinder member are not loaded by external axial forces.

25. A damper unit as set forth in claim 8, said throttled flow passage means comprising second branch passage means and one-way valve means providing in cooperation with said second branch passage means said smaller fluid flow resistance or zero fluid flow resistance.

26. A damper unit as set forth in claim 8, said throttled flow passage means having a decreasing damping resistance characteristic on movement of the respective piston unit toward the respective nearer cylinder end in response to increasing velocity of movement of said piston rod unit such that the increase of damping resistance becomes smaller with increasing velocity.

* * * * *